(12) United States Patent
Garg et al.

(10) Patent No.: US 6,862,315 B1
(45) Date of Patent: Mar. 1, 2005

(54) NETWORK RECEIVER UTILIZING PRE-DETERMINED STORED EQUALIZER COEFFICIENTS

(75) Inventors: Atul Garg, San Jose, CA (US); Colin D. Nayler, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 901 days.

(21) Appl. No.: 09/624,785

(22) Filed: Jul. 25, 2000

(51) Int. Cl.[7] .................................................. H03H 7/30
(52) U.S. Cl. ....................................... 375/232; 375/350
(58) Field of Search .............................. 375/232, 350, 375/348, 229, 231, 230, 346

(56) References Cited

U.S. PATENT DOCUMENTS 6,437,932 B1 * 8/2002 Prater et al. ................... 360/46

2001/0031000 A1 * 10/2001 Nguyen ........................ 375/231
2003/0028569 A1 * 2/2003 Brokish ........................ 708/322

* cited by examiner

*Primary Examiner*—Temesghen Ghebretinsae
*Assistant Examiner*—Guillermo Munoz
(74) *Attorney, Agent, or Firm*—Renner, Otto, Boisselle & Sklar, LLP

(57) ABSTRACT

A network receiver is configured for receiving a modulated carrier signal representing a data frame from a network transmitter via a network medium, the receiver includes an adaptive equalizer with a finite impulse response filter for filtering the received signal. The filter utilizes a plurality of filter coefficients. A cache stores a plurality of sets of coefficients for use by the filter and the equalizer selects a set of coefficients for receiving the data frame.

4 Claims, 3 Drawing Sheets

NETWORK RECEIVER UTILIZING PRE-DETERMINED STORED EQUALIZER COEFFICIENTS

TECHNICAL FIELD

The present invention relates generally to network interfacing, and more particularly, to a network receiver which utilizes pre-determined stored equalizer coefficients for recovering transmitted data.

BACKGROUND OF THE INVENTION

The transmission of various types of digital data between computers continues to grow in importance. The predominant method of transmitting such digital data includes coding the digital data into a low frequency base data signal and modulating the base data signal onto a high frequency carrier signal. The high frequency carrier signal is then transmitted across a network cable medium, via RF signal, modulated illumination, or other network medium, to a remote computing station.

At the remote computing station, the high frequency carrier signal must be received and demodulated to recover the original base data signal. In the absence of any distortion of the carrier signal across the network medium, the received carrier would be identical in phase, amplitude, and frequency to the transmitted carrier and could be demodulated using known mixing techniques to recover the base data signal. The base data signal could then be recovered into digital data using known sampling algorithms.

However, the network topology tends to distort the high frequency carrier signal due to numerous branch connections and different lengths of such branches causing numerous reflections of the transmitted carrier. Such problems are even more apparent in a network which uses home telephone wiring cables as the network cable medium because the numerous branches and connections are typically designed for transmission of plain old telephone system POTS signals in the 0.3–3.4 kilohertz frequency range and are not designed for transmission of high frequency carrier signals on the order of 7 Megahertz.

A typical approach for recovering transmitted data at a receiver operating in such an environment includes the use of an adaptive equalizer for filtering noise and distortion on the received carrier signal. In theory, an equalized signal should match the signal originally transmitted such that a slicer can accurately map the signal to defined constellation points to recover the originally transmitted data.

Known equalizers comprise a complex finite impulse response (FIR) filter comprising an arrangement of four multi-tap FIR filters, each utilizing upward of 11 coefficients. Therefore, the entire complex FIR filter arrangement can use on the order of 44 coefficients. Typically, each of these coefficients is an 11-bit coefficient to maintain an adequate signal to noise ratio. The value of each coefficient is calculated during the training sequence of a frame such that the coefficients are "custom" calculated for the particular distortion present during the short duration of time in which the frame is transmitted and received. A problem associated with such receivers is that coefficient calculation circuitry needed for calculating upward of 44 11-bit coefficients within the short duration of the training period of a frame can require upward of 2.7 billion operations per second. This requires high-speed and costly digital signal processing circuits. Such circuits consume substantial amount of power and are relatively expensive. As a result, such circuits are not practical in battery powered devices for power consumption reasons, and are unsuitable for inexpensive consumer network devices such as smoke detectors, door openers and other devices requiring inexpensive network access.

Therefore, based on recognized industry goals for size, cost, and power reductions, what is needed is a device and method for determining coefficient values that does not suffer the disadvantages of known systems.

SUMMARY OF THE INVENTION

A first aspect of the present invention is to provide a network receiver comprising: a) an analog to digital converter generating a sequence of sample values comprising a digital carrier signal representing a modulated carrier signal received from a transmitting device; b) an adaptive equalizer utilizing a set of adaptive filter coefficients to filter the digital carrier signal to generate an equalized digital carrier signal; and c) a coefficient cache storing a plurality of sets of coefficients, the adaptive equalizer selecting one of the plurality of sets of coefficients to use for filtering.

The network receiver may further include a slicer for receiving the equalized digital carrier signal, mapping the digital carrier signal to a plurality of defined constellation points to recover the transmitted data, and providing the equalizer with an error signal representing the distortion between the equalized carrier signal and the defined constellation points. The equalizer may utilize the error signal to select one of the plurality of sets of coefficients providing minimal error. The selection may be performed during a training sequence during which the equalizer compares the error signal corresponding to a plurality of sets of coefficients for a training portion of the frame in which a predetermined bit sequence is transmitted.

In the preferred embodiment, each of the plurality of sets of coefficients is a predetermined set of coefficients for filtering a digital carrier signal with particular distortion characteristics. The distortion characteristics may be a result of network topology and the transmitters physical location on the network. Each of the plurality of sets of coefficients may be a set of coefficients determined to filter a digital carrier signal from a transmitter at a particular physical location.

The equalizer may include a multi-tap finite impulse response filter and circuitry for calculating a hew set of coefficients for use by the filter for receipt of subsequent frames.

A second aspect of the present invention is to provide a method of receiving a data frame transmitted on a network medium, the method comprising: a) generating a sequence of digital sample values comprising a digital carrier signal representing the transmitted frame; b) selecting one of a plurality of sets of filter coefficients for use by an adaptive equalizer; and c) filtering the digital carrier signal utilizing the selected set of filter-coefficients to generate an equalized digital carrier signal.

The method may further include: d) slicing the equalized digital carrier signal by mapping the digital carrier signal to a plurality of defined constellation points to recover the transmitted data; and e) providing the equalizer with an error signal representing the distortion between the equalized carrier signal and the defined constellation points. Further yet, the error signal may be utilized to select the set of coefficients providing minimal error during a frame training sequence in which a predetermined bit sequence is transmitted.

In the preferred embodiment, each of the plurality of sets of coefficients is a set of coefficients determined to filter a digital carrier signal with particular distortion characteristics. The distortion characteristics may be the result of network topology and the physical location of the transmitter on the network, and each of the plurality of sets of coefficients may be a set of coefficients determined to filter a digital carrier signal from a transmitter at a particular physical location.

The step of filtering may utilize a multi-tap finite impulse response filter and the method may include calculating a new set of filter coefficients, utilizing the training sequence, for use by the multi-tap filter for filtering subsequent data frames.

A third aspect of the present invention is to provide a network receiver comprising: a) an adaptive coefficient filter for removing distortion from a received data signal; b) a coefficient cache storing a plurality of sets of coefficients for use by the adaptive coefficient filter; and c) a selection circuit, operating during a training sequence of the received data signal, for selecting one of the plurality of sets of coefficients for use by the adaptive coefficient filter.

The received data signal may represent a frame of data and the receiver may further comprise a coefficient update circuit utilizing the training sequence for calculating a new set of coefficients for use by the adaptive coefficient filter for receipt of subsequent frames of data.

The receiver may further include a slicer receiving a filtered signal from the adaptive coefficient filter, mapping the filtered signal to a plurality of defined constellation points to recover the transmitted data, and providing the selection circuit with an error signal representing the distortion between the filtered signal and the defined constellation points. The selection circuit may utilize the error signal to select one of the plurality of sets of coefficients providing minimal error. Further, the selection may be performed during a frame training sequence during which the equalizer compares the error signal corresponding to a plurality of sets of coefficients for a training portion of the frame in which a predetermined bit sequence is transmitted.

DESCRIPTION OF THE PREFERRED EMBODIMENTS

Figure 1:
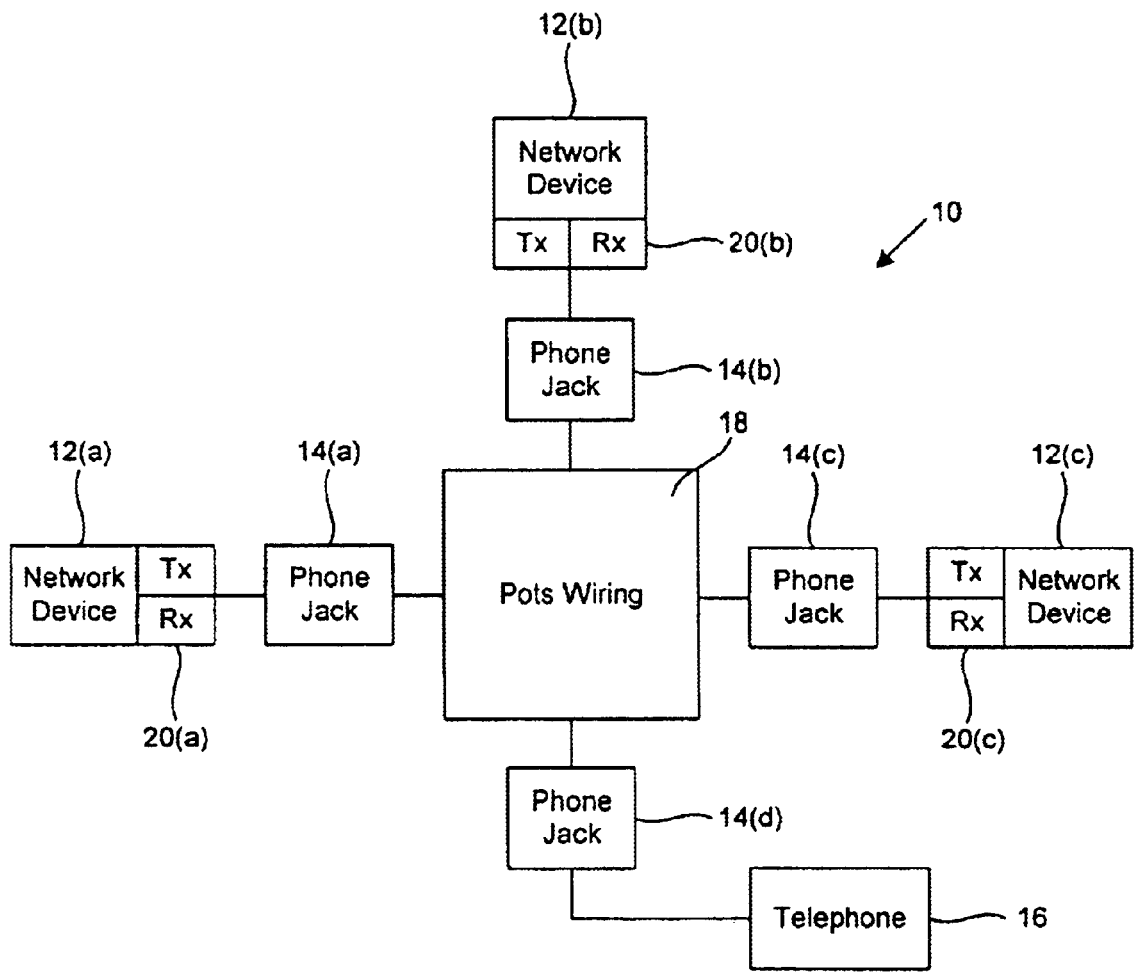
FIG. 1 is a block diagram of a local area network in accordance with one embodiment of this invention.

The present invention will now be described in detail with reference to the drawings. In the drawings, like reference numerals are used to refer to like elements throughout.

FIG. 1 is a diagram of a local area network 10 implemented in a home environment using twisted pair network media according to an embodiment of this invention. As shown in FIG. 1, the network 10 includes network stations 12(a)–12(c) that are connected to a telephone line (twisted pair) wiring 18 via RJ-11 phone jacks 14(a)–14(c) respectively. A telephone 16 is connected to an RJ-11 phone jack 14(d) and may continue to make telephone calls while network devices 12(a)–12(c) are communicating network data.

Each network device 12 may be a personal computer, printer, server, or other intelligent consumer device such as a smoke detector, appliance, door opener or other small electric device. Each of network devices 12(a)–12(c) communicates by transmitting a frame of data built upon analog network carrier signal modulated with payload encoded data. In the preferred embodiment, a quadrature amplitude modulation scheme (QAM) is used in which the data is modulated on the carrier by varying both the amplitude and phase of the carrier in accordance with a complex encoding constellation. The QAM scheme may comply with the Home Phoneline Network Alliance (HPNA) 2.0 standard, as promulgated by a consortium of network equipment providers including Advance Micro Devices, Inc. of Sunnyvale, Calif., and provides for data rates varying from 4-Mbps to 32-Mbps.

Figure 2:
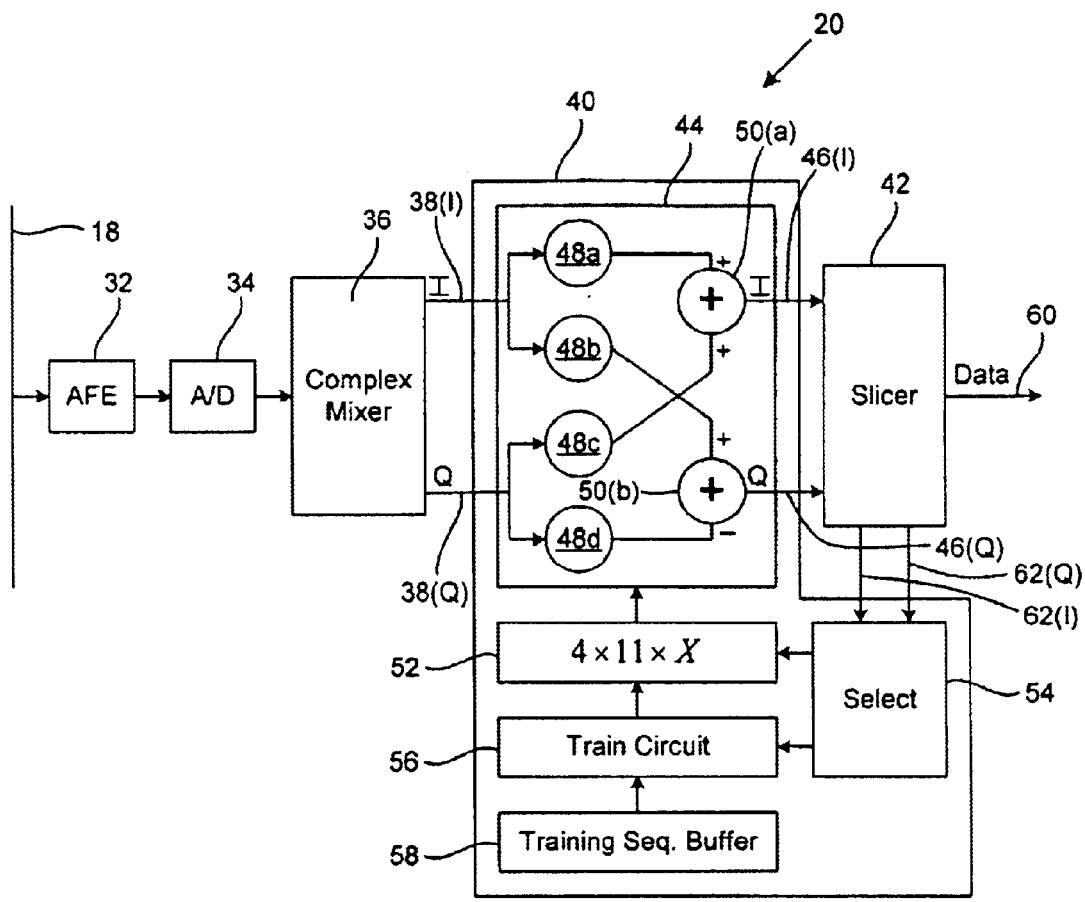
FIG. 2 is a block diagram of a receiver useful in the network of FIG. 1 in accordance with one embodiment of this invention.

Each network device 12 includes a receiver 20(a–20(c) respectively for receiving the data frames on the network media 18. As discussed previously, the numerous branch connections and lengths cause reflections which can significantly distort the QAM carrier signal. Referring to FIG. 2, a block diagram of a receiver circuit 20 useful for recovering data from a distorted QAM carrier signal is shown. Receiver circuit 20 includes an analog front end 32 which operates to detect the modulated carrier signal on the POTS network 18, amplify the signal to utilize the full dynamic range of A/D converter 34, and couple the amplified carrier signal to the AD converter 34.

The A/D converter 34 samples the modulated carrier at a clock frequency at least four times that of the carrier frequency to generate a series of sample values comprising a digital carrier signal. In the preferred embodiment, the A/D converter 34 is a 10-bit A/D converter driven by a 32 MHz clock such that the digital carrier signal is a sequence of 10 bit sample values occurring at a 32 MHz sampling rate.

The digital carrier signal is coupled to a complex mixer 36 which operates to mix down the carrier signal to a base band and generate each of an in-phase (I) and a quadrature phase (Q) base band signal on lines 38(I) and 38(Q) respectively. The base band I and base band Q signals output by the complex mixer 36 are each a series of sample values clocked at the baud rate.

An equalizer 40 which receives the base band I signal and base band Q signal functions to remove distortion caused by propagation of the carrier signal across the POTS network 18 (FIG. 1) and to generate an equalized I signal and an equalized Q signal on lines 46(I) and 46(Q), respectively.

A slicer 42 receives the equalized I signal and the equalized Q signal and operates to map each received coordinate (e.g, an I value from the equalized I signal and a corresponding Q value from the equalized. Q signal) to a defined constellation coordinate to determine the data which was originally transmitted. The data is output on line 60.

Because the defined constellation coordinates utilized for transmission of the data frame are the same as those used by the slicer 42 for receiving the data frame, in theory, if there was no distortion, each received coordinate would exactly match the defined coordinate. However, due to distortion and imperfect operation of the equalizer 40 to remove the distortion, the slicer 42 maps each received coordinate to the closest defined coordinate. Further, the slicer 42 functions, in a conventional manner, to generate an error signal, which is coupled back to the equalizer 40 on lines 62(I) and 62(Q), representing the distortion between the received coordinate and the defined coordinate.

The equalizer 40 includes a complex finite impulse response (FIR) filter 44 including four 11-tap FIR filters

48(a)–48(d), each utilizing FIR principals to filter a single signal utilizing eleven 11-bit coefficients. The base band I signal is input to filters 48(a) and 48(b) while the base band Q signal is input to filters 48(c) and 48(d). The outputs of filters 48(a) and 48(c) are added in adder 50(a) to generate the equalized I signal on line 46(I). The output of filter 46(d) is subtracted from the output of filter 48(b) in adder 50(b) to generate the equalized Q signal on line 46(Q).

Because, in the HPNA 2.0 environment, each of filters 48(a)–48(d) requires eleven 11-bit coefficients to operate and maintain an adequate signal to noise ratio, a total of 44 coefficients are required for operation of the four filters 48(a)–48(d) comprising the complex filter 44. The value of each of the coefficients must be determined such that, in the aggregate, the complex filter 44 functions to compensate for distortion occurring in the network. Furthermore, because the distortion affecting any particular frame is a function of the transmitter's and receiver's physical location on the POTS network 18 and a function of the noise effecting the POTS network 18 during the duration of time in which the frame is transmitted, the coefficients best suited for compensating for distortion for a particular frame may be fundamentally different than those best suited for compensating for distortion for a frame transmitted by a different transmitter and/or during a different time period. Referring back to FIG. 1 for example, the coefficients adapted for receiving a frame at receiver 20(c) from device 12(b) may be fundamentally different than the coefficients adapted to receive a signal from 12(a). Further, the coefficients adapted to receive a frame from device 12(b) during one time period may not be suitable for receiving a frame from device 12(b) during a different time period in which electromagnetic interference effecting the POTS network 18 has changed.

However, it should be appreciated that although electromagnetic interference effecting the POTS network 18 is fluctuating, the interference can be approximated as static for the short durations of time in which a frame, or even several sequential frames, are transmitted. Therefore, this invention appreciates that coefficients useful for receiving a frame from a particular device typically remain static over at least short time durations in which several frames may be transmitted.

Referring again to FIG. 2, a coefficient cache 52 stores a plurality of sets of coefficients for the complex filter 44. In the preferred embodiment, 32 sets of coefficients are stored in the coefficient cache 52. Each set of coefficients is a set that was calculated as optimal for receipt of a recently received frame as will be discussed in more detail herein.

A selection circuit 54 operates during the training sequence of a received frame to select which set of the stored coefficients stored in cache 52 provides for the best equalized I and Q signals (e.g. smallest error signal on lines 62(I) and 62(Q)). As discussed previously, because coefficients useful for receiving a frame from a particular device typically remain static over at least short time durations, there is a high probability that a set of stored coefficients will be adequate for receipt of the frame. Because the selection circuitry 54 of this invention merely selects from a set of stored coefficients rather than calculating a set of coefficients during the time duration of the training sequence, selection circuitry 54 may be extremely simple, low speed, and low gate count compared to coefficient calculation circuitry used in known equalizers.

As previously discussed, the approximation of static distortion characteristics do not hold over longer duration time periods. Therefore, the equalizer 40 must continually update the stored coefficients to reflect then current network distortion characteristics. To accomplish this, equalizer 40 utilizes the training sequence of each received frame to calculate a new set of coefficients for storage in the coefficient cache 52 for potential use in receiving subsequent frames. More particularly, equalizer 40 includes a training sequence buffer 58 in which the base band I and Q signals for the training sequence of a frame are buffered. A training circuit 56 utilizes the buffered training sequence to calculate a new set of coefficients that are optimized for the distortion encountered in the base band I and Q signals representing the training sequence. These newly calculated coefficients are then stored in the coefficient cache 52 for subsequent use.

The training circuit 56 utilizes algorithms which are similar to those used by conventional coefficient calculation circuits in conventional equalizers. However, conventional coefficient calculation circuits use high speed and high gate count circuits because the coefficients must be calculated within the short time duration of the training sequence so that the coefficients can immediately be used for receipt of the frame. The training circuit 56 of this invention may utilize less complex and smaller gate count circuits to calculate the coefficients over a much longer time period (e.g. time duration of the entire frame or more) because the coefficients will not be used for receipt of the frame. The coefficients will be stored in the coefficient cache 52 and, if used at all, will be used for receipt of subsequent frames only.

It should be appreciated that the coefficient cache 52 has a limited storage capacity. As such, sets of coefficients may be overwritten with newly calculated sets in a FIFO basis, on a basis of how frequently the set was used, on a basis of how close the set is to a newly calculated set, or some combination of the above and other factors. It should also be appreciated that when a device is first connected to the network 18 and powered-up, there will not be any sets of coefficients stored in the coefficient cache 52. As such, it will not be possible for the device to receive frames. Therefore, upon initial power-up and during dwell periods when the device is not transmitting or receiving, the device monitors the network traffic and may utilize the training sequences of frames addressed for calculating coefficient sets.

Figure 3:
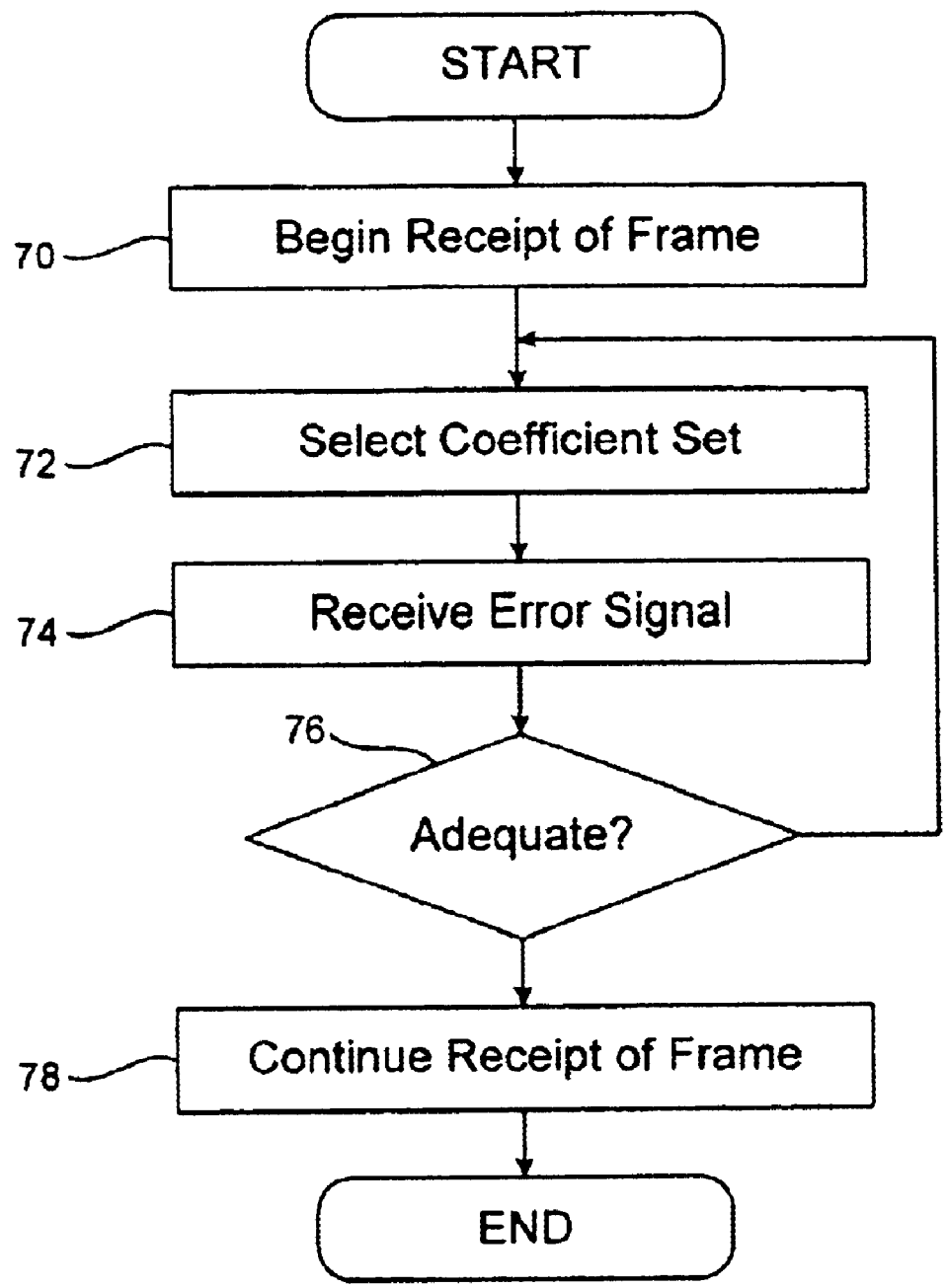
FIG. 3 is a flow chart showing exemplary operation of a selection circuit useful in the receiver of FIG. 2.

Referring to the flowchart of FIG. 3 in conjunction with FIG. 2, operation of the selection circuit 54 is shown. Step 70 represents the receipt of the beginning of a frame including the first portion of the training sequence. At step 72, the selection circuit 54 selects one of the stored sets of coefficients from the coefficient cache 52. Step 74 represents the receipt of the error signals on lines 62(I) and 62(Q) which represent the error between received coordinates utilizing the coefficients selected at step 72 and the defined coordinates of the bits of the known training sequence. If at step 76 the error is small, or non existent, the selection circuitry proceeds to step 78 in which it receives the remainder of the frame utilizing the selected coefficient set. However, if at step 76 the error is large, the selection circuitry proceeds back to step 72 in which it selects another one of the stored sets of coefficient from the coefficient cache 52. It should be appreciated that the selection circuitry may cycle through steps 72, 74, and 74 multiple times during the training sequence to determine which of the stored coefficients from the coefficient cache 52 is best utilized for receipt of the frame.

It should be appreciated that the above described device and methods provide for a simplified receiver system by utilizing stored coefficient values for the equalizer while simultaneously updating the stored coefficient values to assure operation in changing distortion environments. Although the invention has been shown and described with respect to certain preferred embodiments, it is obvious that equivalents and modifications will occur to others skilled in the art upon the reading and understanding of the specification. For example, while the exemplary embodiment is directed towards HPNA QAM modulation, the invention is as readily useful in frequency modulation, phase shift keying, and other modulation techniques as well as for base band signaling. The present invention includes all such equivalents and modifications, and is limited only by the scope of the following claims.

What is claimed is:

1. A network receiver comprising:

an analog to digital converter generating a sequence of sample values comprising a digital carrier signal representing a modulated carrier signal received from a transmitting device;

an adaptive equalizer utilizing a set of adaptive filter coefficients to filter the digital carrier signal to generate an equalized digital carrier signal;

a coefficient cache storing a plurality of sets of coefficients, the adaptive equalizer selecting one of the plurality of sets of coefficients to use for filtering, wherein while a selected one of the plurality of sets of coefficients is utilized to filter the digital carrier signal, the equalizer further includes circuitry for simultaneously calculating a new set of coefficients for use by the equalizer for receipt of subsequent frames; and a slicer receiving the equalized digital carrier signal, mapping the digital carrier signal to a plurality of defined constellation points to recover the transmitted data, and providing the equalizer with an error signal representing the distortion between the equalized carrier signal and the defined constellation points and wherein the equalizer utilizes the error signal to select one of the plurality of sets of coefficients providing minimal error, wherein each of the plurality of sets of coefficients is a set of coefficients determined to filter a digital carrier signal with particular distortion characteristics, the selection is performed during a frame training sequence in which the equalizer compares the error signal corresponding to a plurality of sets of coefficients for a training portion of the frame in which a predetermined bit sequence is transmitted, and the distortion characteristics are a result of network topology and the transmitter's physical location on the network and each of the plurality of sets of coefficients is a set of coefficients determined to filter a digital carrier signal from a transmitter at a particular physical location.

2. The network receiver of claim 1, wherein the equalizer includes a multi-tap finite impulse response filter.

3. A method of receiving a data frame transmitted on a network medium, the method comprising:

generating a sequence of digital sample values comprising a digital carrier signal representing the transmitted frame;

selecting one of a plurality of sets of filter coefficients for use by an adaptive equalizer;

filtering the digital carrier signal utilizing the selected set of filter coefficients to generate an equalized digital carrier signal, wherein while a selected one of the plurality of sets of coefficients is utilized to filter the digital carrier signal, simultaneously calculating a new set of coefficients for use in equalizing subsequent frames;

slicing the equalized digital carrier signal by mapping the digital carrier signal to a plurality of defined constellation points to recover the transmitted data, and providing the equalizer with an error signal representing the distortion between the equalized carrier signal and the defined constellation points; and utilizing the error signal to select the set of coefficients providing minimal error, wherein each of the plurality of sets of coefficients is a set of coefficients determined to filter a digital carrier signal with particular distortion characteristics, the step of selecting is performed during a frame training sequence in which a predetermined bit sequence is transmitted, and the distortion characteristics are a result of network topology and the transmitter's physical location on the network and each of the plurality of sets of coefficients is a set of coefficients determined to filter a digital carrier signal from a transmitter at a particular physical location.

4. The method of claim 3, wherein the step of filtering utilizes a multi-tap finite impulse response filter.

* * * * *

UNITED STATES PATENT AND TRADEMARK OFFICE
CERTIFICATE OF CORRECTION

PATENT NO. : 6,862,315 B1
DATED : March 1, 2005
INVENTOR(S) : Garg et al.

It is certified that error appears in the above-identified patent and that said Letters Patent is hereby corrected as shown below:

Column 2,
Line 46, replace "hew" with -- new --.

Column 4,
Line 16, replace "(a" with -- (a) --.
Line 51, remove ".".

Signed and Sealed this

Seventeenth Day of May, 2005

JON W. DUDAS
*Director of the United States Patent and Trademark Office*